(12) United States Patent  (10) Patent No.: US 6,189,527 B1
Walsh et al.  (45) Date of Patent: Feb. 20, 2001

(54) ADJUSTABLE GRID ASSEMBLY FOR A BARBECUE GRILL

(76) Inventors: James Patrick Walsh, 8301 Poplar Creek Rd., Nashville, TN (US) 37221; Steven Courtney Rollins, 4946 Tyne Valley Blvd., Nashville, TN (US) 37215

( * ) Notice: Under 35 U.S.C. 154(b), the term of this patent shall be extended for 0 days.

(21) Appl. No.: 09/265,052

(22) Filed: Mar. 9, 1999

(51) Int. Cl.[7] .................................................. A47J 37/06
(52) U.S. Cl. ........................ 126/25 R; 211/175; 211/181.1
(58) Field of Search .............................. 126/25 R, 25 A, 126/41 R, 152 B, 153; 99/449; 211/175, 181.1, 90.03

(56) References Cited

U.S. PATENT DOCUMENTS

| | | |
|---|---|---|
| D. 271,740 | 12/1983 | Borglum . |
| 1,263,863 * | 4/1918 | Crosby .................................... 99/449 |
| 2,549,709 * | 4/1951 | Potts ....................................... 99/449 |
| 3,585,922 * | 6/1971 | Peterson et al. ........................ 99/449 |
| 3,931,805 | 1/1976 | Nelson . |
| 3,933,144 | 1/1976 | Bandy . |
| 4,120,280 | 10/1978 | Iverson et al. . |
| 4,362,093 | 12/1982 | Griscom . |
| 4,382,432 | 5/1983 | Lizdas . |
| 4,432,334 * | 2/1984 | Holt ................................... 126/25 R |
| 4,434,780 | 3/1984 | Hepner . |
| 4,462,306 | 7/1984 | Eisendrath . |
| 4,553,523 * | 11/1985 | Stohrer, Jr. ....................... 126/152 B |
| 4,553,525 | 11/1985 | Ruble . |
| 4,592,335 | 6/1986 | Beller . |
| 4,932,390 | 6/1990 | Ceravolo . |
| 5,033,448 | 7/1991 | Sandweg . |
| 5,042,451 | 8/1991 | Beller . |
| 5,070,777 | 12/1991 | Novak . |
| 5,117,806 | 6/1992 | Soat . |
| 5,178,126 | 1/1993 | Beller . |
| 5,265,586 | 11/1993 | Salerno . |
| 5,359,923 | 11/1994 | Boswell . |
| 5,515,839 * | 5/1996 | Phillips .............................. 126/25 R |
| 5,640,895 | 6/1997 | Anetsberger . |
| 5,642,658 | 7/1997 | Leibermann . |
| 5,758,568 | 6/1998 | Moravec . |

* cited by examiner

Primary Examiner—Ira S. Lazarus
Assistant Examiner—Sara Clarke
(74) Attorney, Agent, or Firm—Stephen T. Belsheim

(57) ABSTRACT

An adjustable depth grid assembly for a barbecue grid. The assembly includes a grid body which has a plurality of grid cross wires whereby the grid cross wires provide support for food, as well as optionally cooking briquettes, lava rocks, and/or other flavor enhancers, resting thereon. The grid body includes at least one bracket. The grid assembly also includes an outrigger which has a plurality of outrigger cross wires whereby the outrigger cross wire provide support for food resting thereon. The outrigger has at least one locator wire wherein the locator wire is slidably received in the bracket so that the depth of the grid assembly is adjustable.

16 Claims, 8 Drawing Sheets

ADJUSTABLE GRID ASSEMBLY FOR A BARBECUE GRILL

BACKGROUND

The present invention pertains to an adjustable grid assembly, and in particular, to an adjustable replacement grid assembly for a barbecue grill.

One important component of a complete barbecue grill is the grid assembly since the food-to-be-cooked rests on the grid assembly. It is not unusual that the original grid assembly on the barbecue grill is not adjustable. Over the course of time and after continuous use, the grid assembly becomes worn or unusable so that the replacement of the grid assembly becomes necessary.

One type of replacement grid assembly comprises a replica of the non-adjustable original grid assembly. While such a non-adjustable replica grid assembly adequately performs its function, it may only be used in conjunction with the original barbecue grill. Hence, the size of the potential market for a non-adjustable replica replacement grid assembly is not as great as the potential market for a grid assembly which could accommodate barbecue grills of various dimensions.

Another type of replacement grid assembly is adjustable as to adapt to the depth of the barbecue grill by the use of slidable extension bars which slidably connect through connector tubes to the front edge and/or the rear edge of a grill body. By adjusting the distance the extension bars project from the edges of the grid body, the grid assembly can adjust to the depth of the barbecue grill. Thus, this type of grid assembly (which uses extension bars) can accommodate a number of barbecue grills which have a constant width and varying depths.

Even though the replacement grid assembly (which has the extension bars) is adjustable for the depth of the barbecue grill, there remain a number of drawbacks associated with this type of grid assembly. These extension bars do not provide for a cooking (or grilling) surface over the entire depth of the barbecue grill because the extension bars do not comprise a cooking surface.

Furthermore, the replacement grid assembly with the extension bars does not readily adapt to coating, especially coating with porcelain, because the connector tubes become filled (or clogged) with the coating material during the coating operation.

The extension bars also do not provide for a great deal of support for the grid body since the extension bars comprise only a few bars, widely-spaced apart, connected to a cross-bar. By necessity, these extension bars must be of a size that is small enough so that if they are coated they will still fit within the tube portion of the cooking grid. As a consequence only a few bars at the front edge and rear edge of the grid assembly support the weight of any food on the grid assembly. Hence, the grid assembly with the extension bars cannot typically support any more than about twenty to twenty-five pounds of food before sagging or completely collapsing.

It thus becomes apparent that it would be desirable to provide for an improved adjustable grid assembly wherein there is a cooking surface over the entire depth of the barbecue grill so as to utilize the entire cooking capability of the barbecue grill. It would also be highly desirable to provide for an improved adjustable grid assembly wherein the grid assembly has the structural integrity so as to be able support a significant amount of weight (e.g., at least from about fifty to seventy-five pounds) of food-to-be-cooked.

It is further desirable to provide ease of porcelain enamel coating, where required, so as to allow for ease of adjustability.

SUMMARY

In one form thereof, the invention is an adjustable depth grid assembly for a barbecue grill wherein the assembly comprises a grid body which has a plurality of cross wires whereby the cross wires provide support for the food resting thereon. The grid body further includes at least one bracket. The grid assembly also has an outrigger which has a plurality of outrigger cross wires whereby the outrigger cross wire provide support for food resting thereon. The outrigger has at least one locator wire wherein the locator wire is slidably received in the bracket so that the depth of the grid assembly is adjustable.

In another form thereof, the invention is an adjustable depth grid assembly for a barbecue grill. The assembly comprises a grid body having a grid cross wire means for supporting food resting thereon, and an outrigger having an outrigger cross wire means for supporting food resting thereon. The outrigger further including a locator wire. The grid body further including a bracket that receives and supports the locator wire. The depth of the grid assembly is adjustable upon the sliding of the locator wire.

In still another form thereof, the invention is an adjustable depth grid assembly for a barbecue grill. The assembly comprises a grid body having a plurality of grid cross wires whereby the grid cross wires provide support for food resting thereon. The grid body further includes at least a first bracket and an opposite second bracket. The grid cross wires includes one edge grid cross wire and an opposite edge grid cross wire. The grid assembly further includes one outrigger having a plurality of outrigger cross wires whereby the outrigger cross wires provide support for food resting thereon. The one outrigger has at least one locator wire wherein the locator wire is slidably received in the first bracket so that the depth of the grid assembly is adjustable relative to the one edge grid cross wire. The grid assembly further includes another outrigger having a plurality of outrigger cross wires whereby the outrigger cross wires provide support for food resting thereon. The other outrigger has at least one locator wire wherein the locator wire is slidably received in the second bracket so that the depth of the grid assembly is adjustable relative to the other edge grid cross wire.

BRIEF DESCRIPTION OF THE DRAWINGS

The following is a brief description of the drawings which form a part of this patent application.

DETAILED DESCRIPTION

Figure 1:
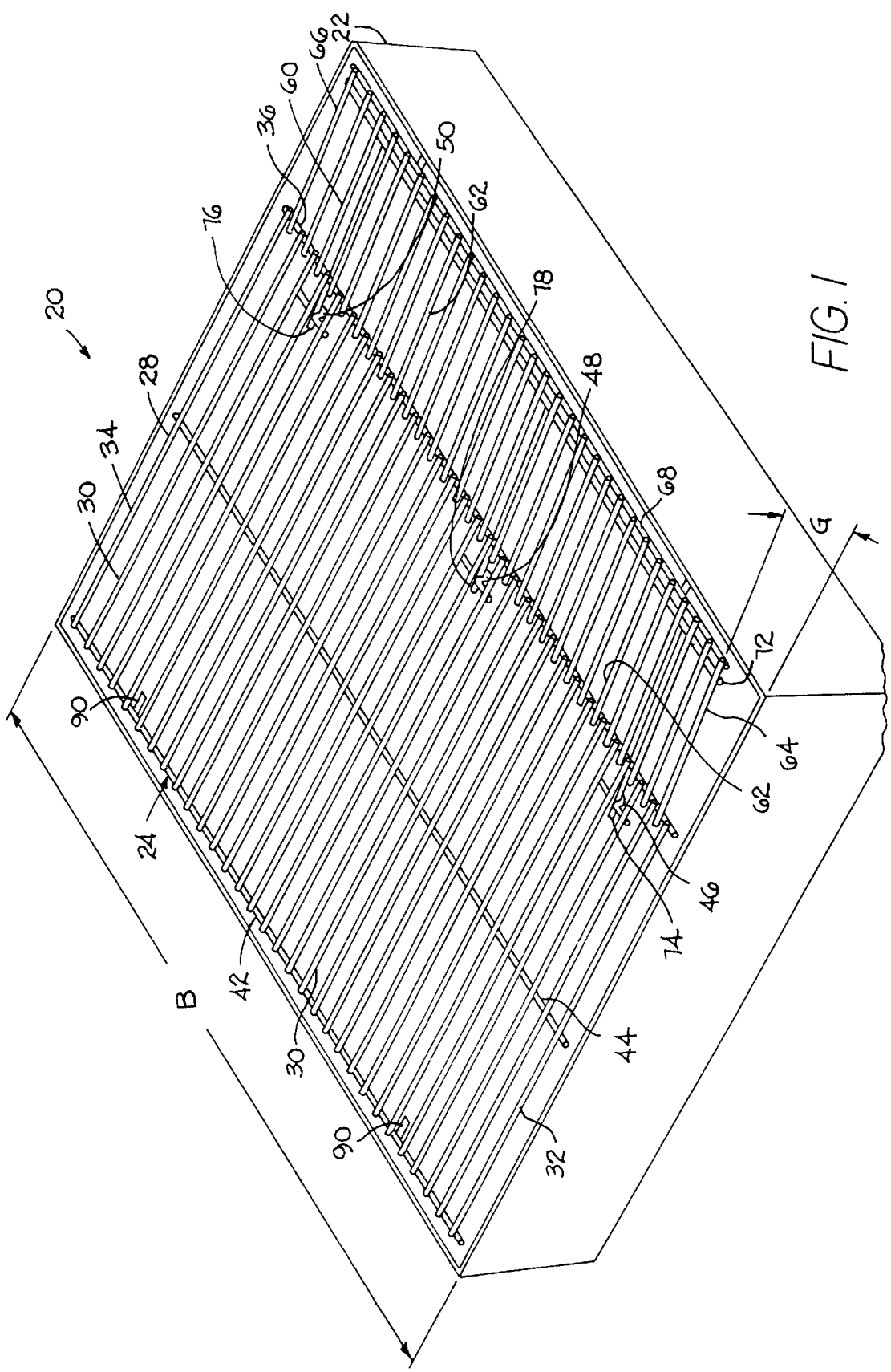
FIG. 1 is an isometric view of a first specific embodiment of the grid assembly of the invention wherein the grid assembly, which comprises a grid body and an outrigger, rests on supports on the interior walls that define, at least in part, the firebox of the barbecue grill.

Referring to the drawings, there is illustrated a barbecue grill, generally designated as 20 (see FIG. 1). Barbecue grill 20 includes a generally rectangularly-shaped firebox 22 and a grid assembly generally designated as 24.

The grid assembly 24 includes a grid body 28 which comprises a plurality of mediate cross wires 30 wherein all of the mediate cross wires 30 are generally parallel to one another. The grid body 28 further includes an edge cross wire 32 which defines one edge of the grid body 28 and another edge cross wire 34 which defines the other, opposite edge of the grid body 28. The mediate cross wires 30, the one edge cross wire 32, and the other edge cross wire 34 are generally parallel to each other.

Figure 2:
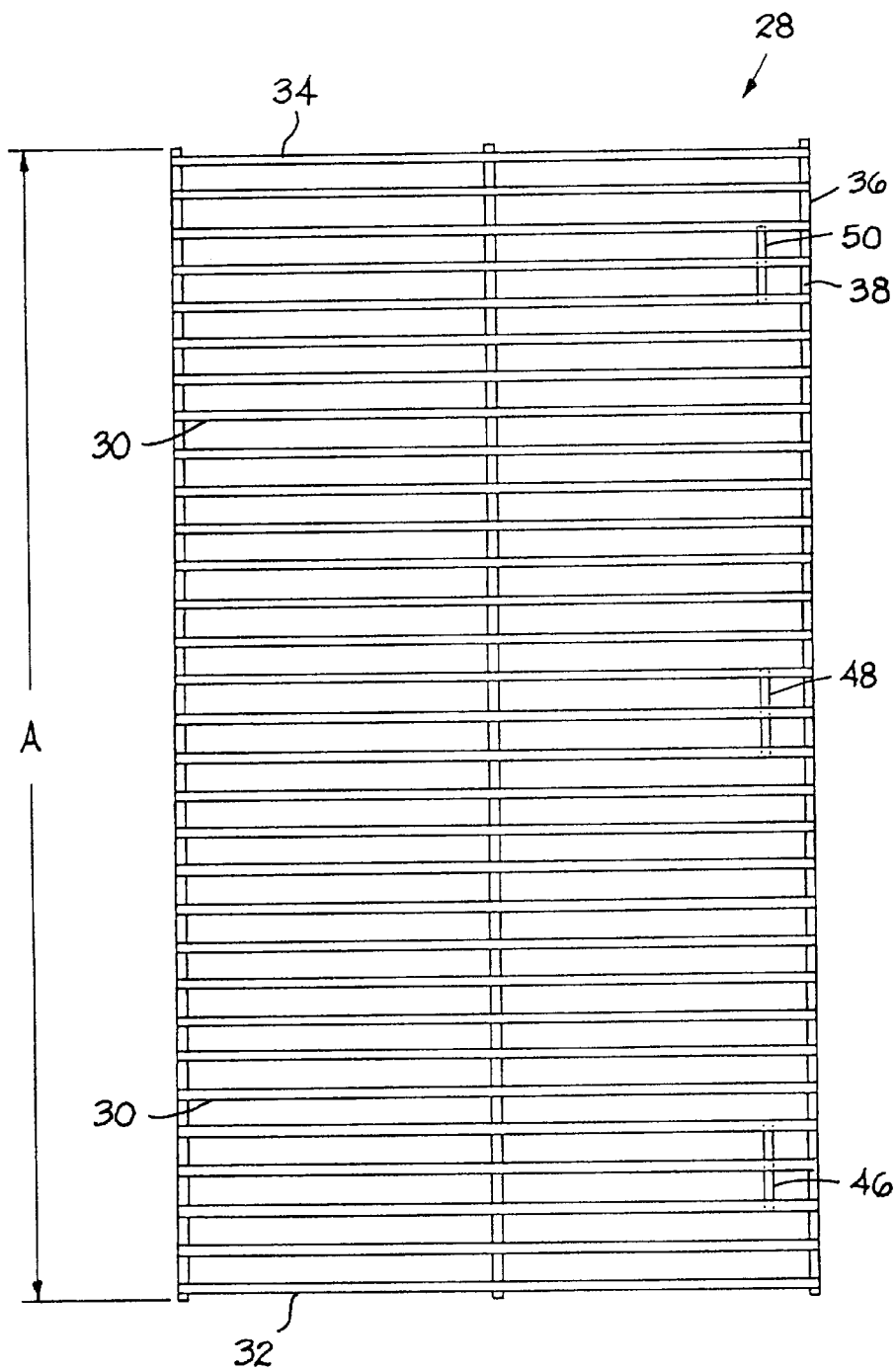
FIG. 2. is a top view of the grid body of the grid assembly of FIG. 1.
Figure 3:
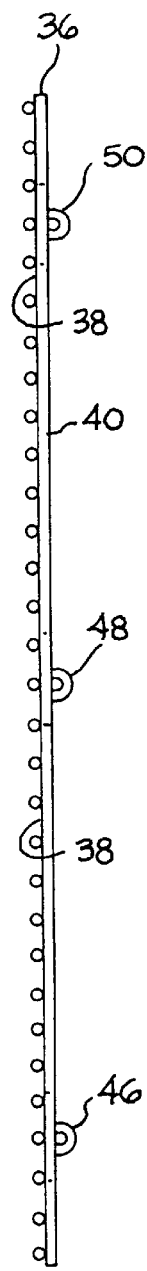
FIG. 3. is an end view of the grid body of FIG. 2.

The grid body 28 further includes a front brace wire 36 which has a top surface 38 and a bottom surface 40 (see FIGS. 2 and 3). The grid body 28 also includes a rear brace wire 42 and a mediate brace wire 44. The front brace wire 36, the mediate brace wire 44, and the rear brace wire 42 are each generally perpendicular to the grid cross wires (30, 32, 34). The front brace wire 36, the rear brace wire 42 and the mediate brace wire 44 are attached to all of the cross wires, i.e., all of the mediate cross wires 30, the one edge cross wire 32 and the other edge cross wire 34. A trio of U-shaped (or omega-shaped) brackets 46, 48, 50 are affixed to the bottom surface 40 of the front brace wire 36. As is apparent from the drawings, each bracket (46, 48, 50) presents a passage through which a wire may pass as will be described hereinafter. Furthermore, each bracket is of a dimension so as to provide for ample volume in the passage after the application of a coating material (e.g., porcelain enamel, nickel, chrome, etc.) to the bracket which permits the smooth and easy passage of the outrigger 60 through the bracket (as will be described hereinafter) whether in the coated or uncoated condition.

The grid assembly 24 further includes an outrigger generally designated as 60. The outrigger 60 contains a plurality of mediate outrigger cross wires 62 along with an edge outrigger cross wire 64 which defines one edge of the outrigger 60 and another edge outrigger cross wire 66 which defines the other, opposite edge of the outrigger 60. All of the cross wires, i.e., the mediate cross wires 62, the one edge cross wire 64 and the other edge cross wire 66, are generally parallel to one another. The outrigger 60 further includes a brace wire 68 which has an orientation that is generally perpendicular to the cross wires (62, 64, 66). The outrigger also has a spacer wire 72 spaced inwardly from the brace wire 68. The spacer wire 72 has an orientation that is generally perpendicular to the cross wires (62, 64, 66). The brace wire 68 and the spacer wire 72 are each attached to the outrigger cross wires (62, 64, 66). The spacer wire 72 provides for spacing between the cross wires (62, 64, 66), as well as the locator wires (74, 76, 78) as described hereinafter. The spacer wire 72 also controls the warpage (or the tendency to warp) of the grid assembly which may occur during the enamelling (coating) process. The spacer wire 72 should be of such a size that it provides for good strength against such warpage. In this regard, the diameter of the spacer wire 72 is larger than the diameter of the brace wire 68.

The outrigger 60 has two edge locator wires (74, 76) and one mediate locator wire 78. The locator wires (74, 76, 78) are attached to the spacer wire 72. The one edge locator wire 74 has a spring clip 82 (or some type of stop member) attached thereto. The other edge locator wire 76 also has a spring clip 84 (or some type of stop member) attached thereto. Spring clips 82 and 84 are movable along the locator wires so that their position may vary. Applicants contemplate that the spring clip may be permanent (i.e., not movable along the length of the locator wire). Furthermore, when the assembly has an enamel coating thereon, there is sufficient frictional resistance so as to provide for resistance against any movement even in the absence of spring clips.

Figure 4:
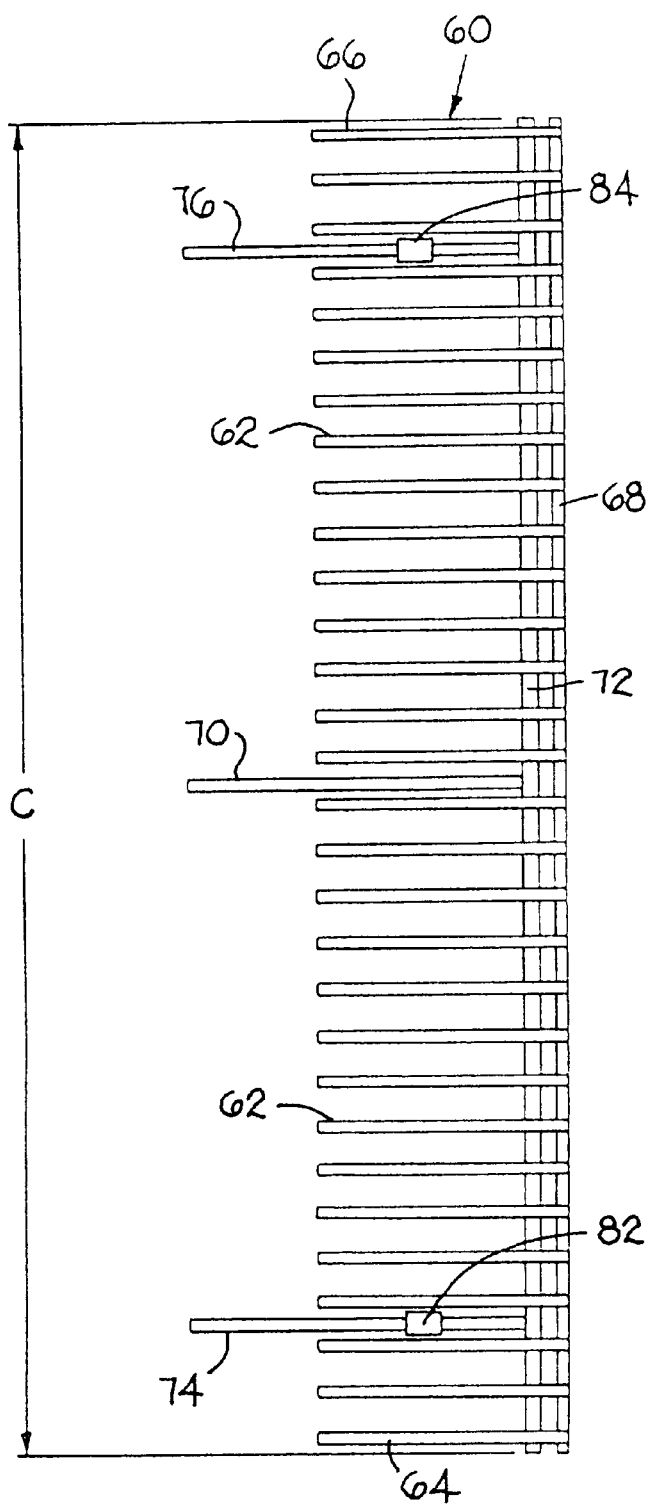
FIG. 4 is a top view of the outrigger of the grid assembly of FIG. 1.
Figure 5:
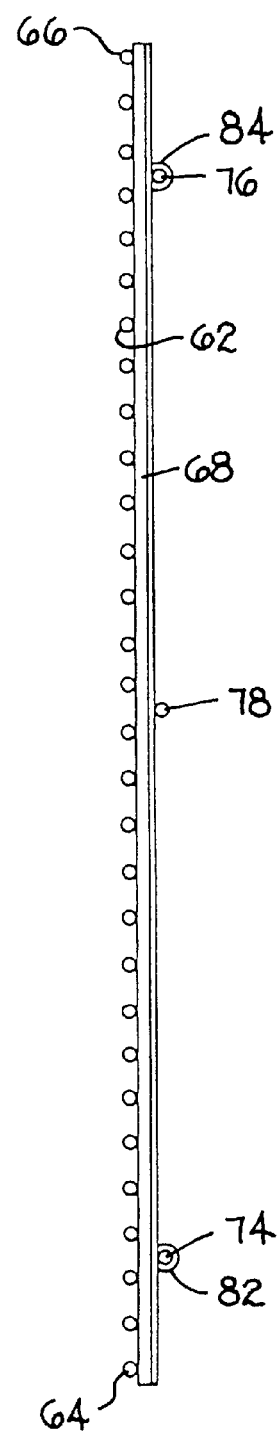
FIG. 5 is an end view of the outrigger of FIG. 4.

In regard to the assembly of the grid assembly, the grid body 28 has a width "A" (see FIG. 2) which corresponds to the width "B" (see FIG. 1) of the firebox 22 of the barbecue grill 20. Typically, the grid body 28 fits in the firebox 22 by resting upon supports 90 that project from the inside walls of the firebox 22. The outrigger 60 has a width "C" (see FIG. 4) that corresponds to the width of the grid body 28 and the width of the firebox 22 so that the outrigger 60 functions with the grid body 28 to form a complete grid assembly for use with a barbecue grill 20 having a firebox 22 of a width "B".

To assemble the grid assembly, the locator wires (74, 76, 78) on the outrigger 60 are passed through the passages defined by the U-brackets (46, 48, 50), respectively. The outrigger 60 may then be moved (or slid) relative to the grid body 28 so as to selectively vary the depth "E" (see FIG. 6) of the grid assembly. Because the outrigger 60 is adjustable relative to the grid body 28, the grid assembly 20 is able to adjust to accommodate barbecue grills of different depths and having a width "B".

Figures 6, 7:
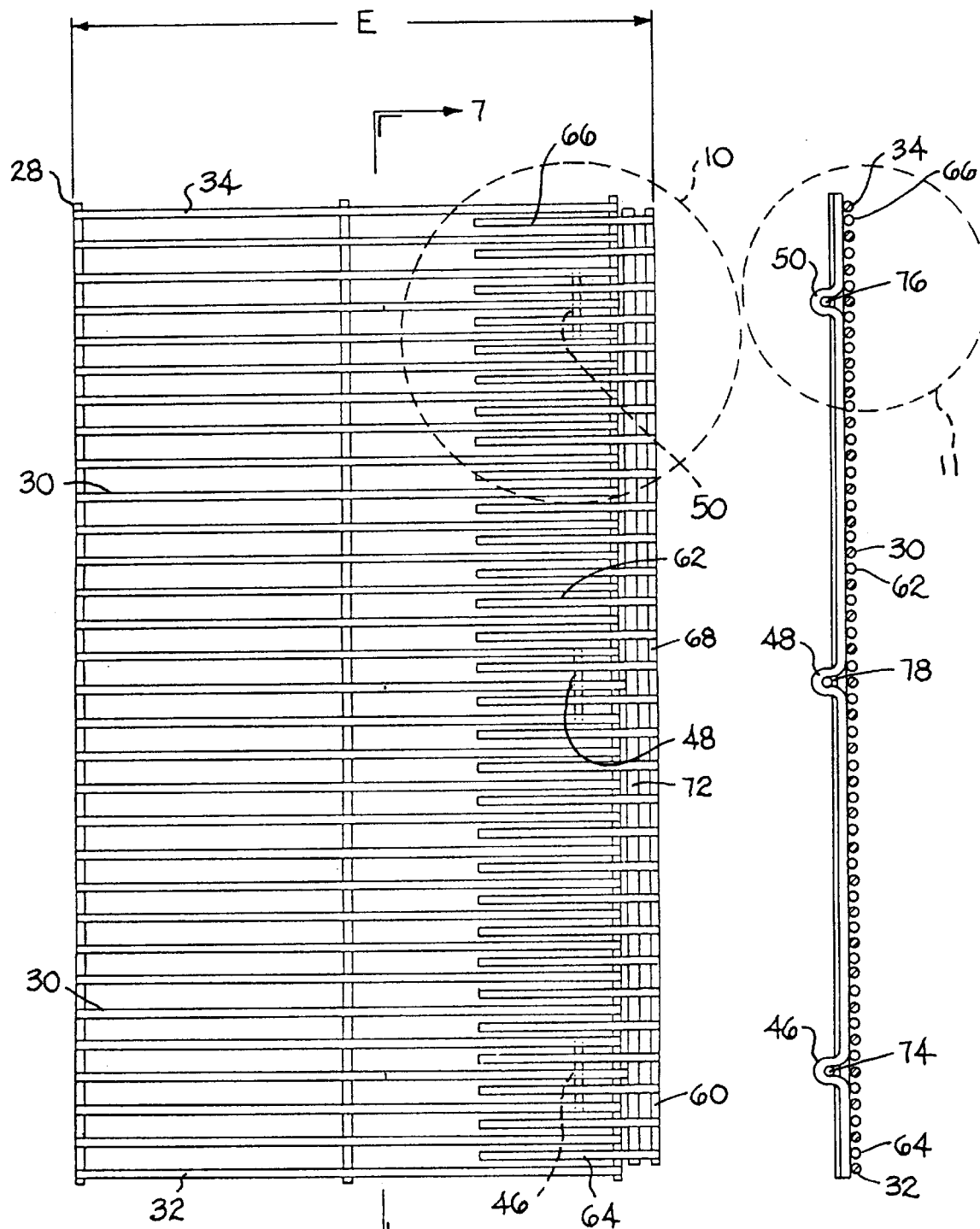
FIG. 6 is a top view of the grid assembly of FIG. 1 wherein the outrigger extends inwardly into the grid body so as to present a grid assembly with a predetermined depth.
FIG. 7 is a cross-sectional view of the grid assembly of FIG. 6 taken along section line 7—7 of FIG. 6.

Referring to the adjustability feature of the grid assembly, FIG. 6 and FIG. 7 illustrate the grid assembly in a position so that it is adjusted to present a pre-selected depth. In this position, the outrigger is moved toward the grid body to the maximum extent possible; however, it should be appreciated that the minimum depth of the grid assembly occurs when using the grid body alone. In FIG. 6 no spring clips (or stop members) are on the locator wires; however, it should be appreciated that the presence of stop members would limit the extent to which the outrigger can be moved toward the grid body in that the distal ends of the locator wires would abut against the stop members.

Figure 8:
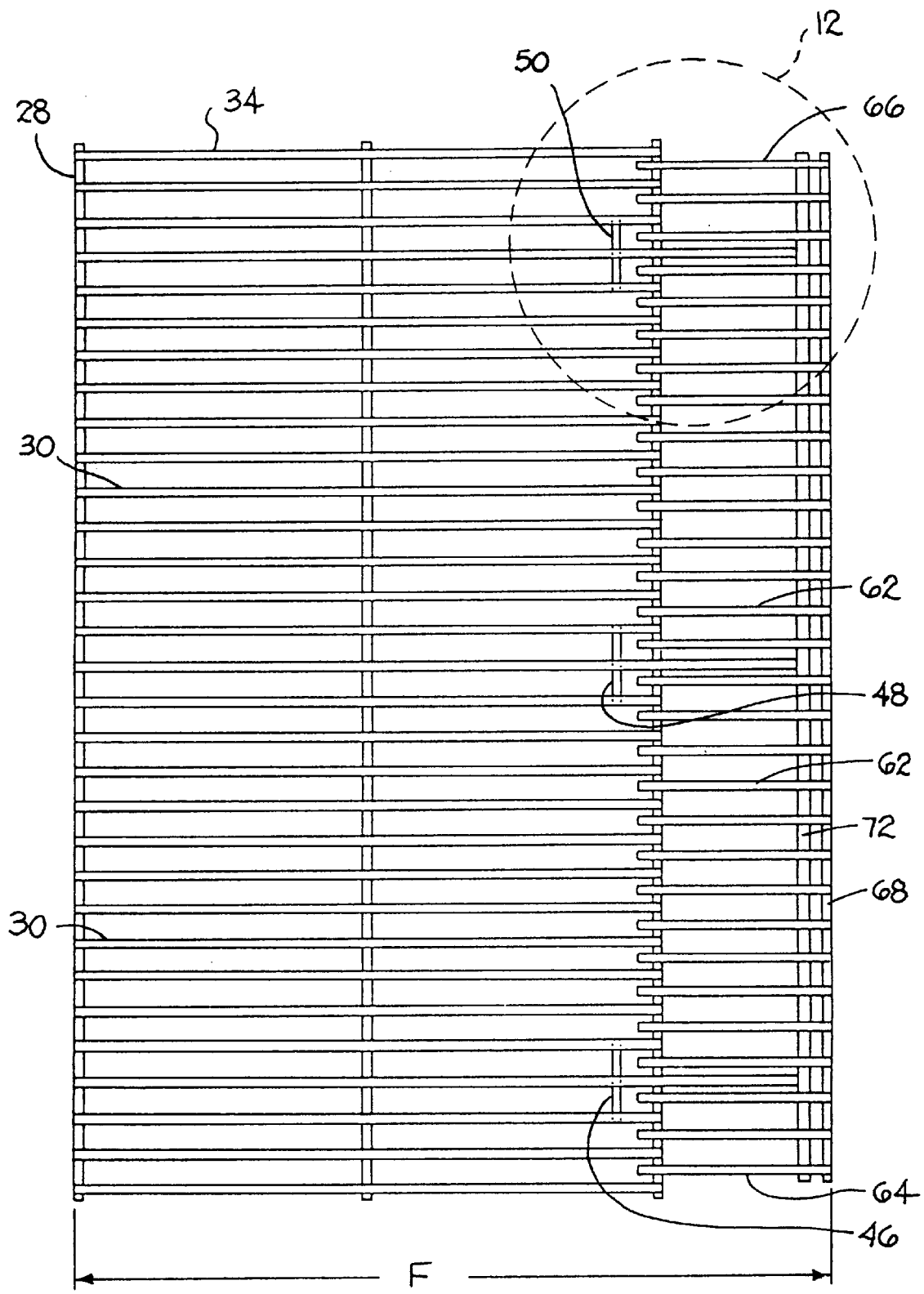
FIG. 8 is a top view of the grid assembly of FIG. 6 wherein the outrigger has been extended outwardly from the grid body so as to provide for a grid assembly with a depth greater than that illustrated in FIG. 6.

FIG. 8 illustrates the grid assembly in a condition wherein the outrigger is positioned so as to maximize the depth "F" of the grid assembly.

After assembly and as shown in FIG. 1, it should be appreciated that the outrigger slopes slightly toward the firebox bottom so that utensils will remain unobstructed on the grid surface. In this regard, the angle "G" between the surface of the outrigger and the horizontal plane is about two degrees.

Figure 9:
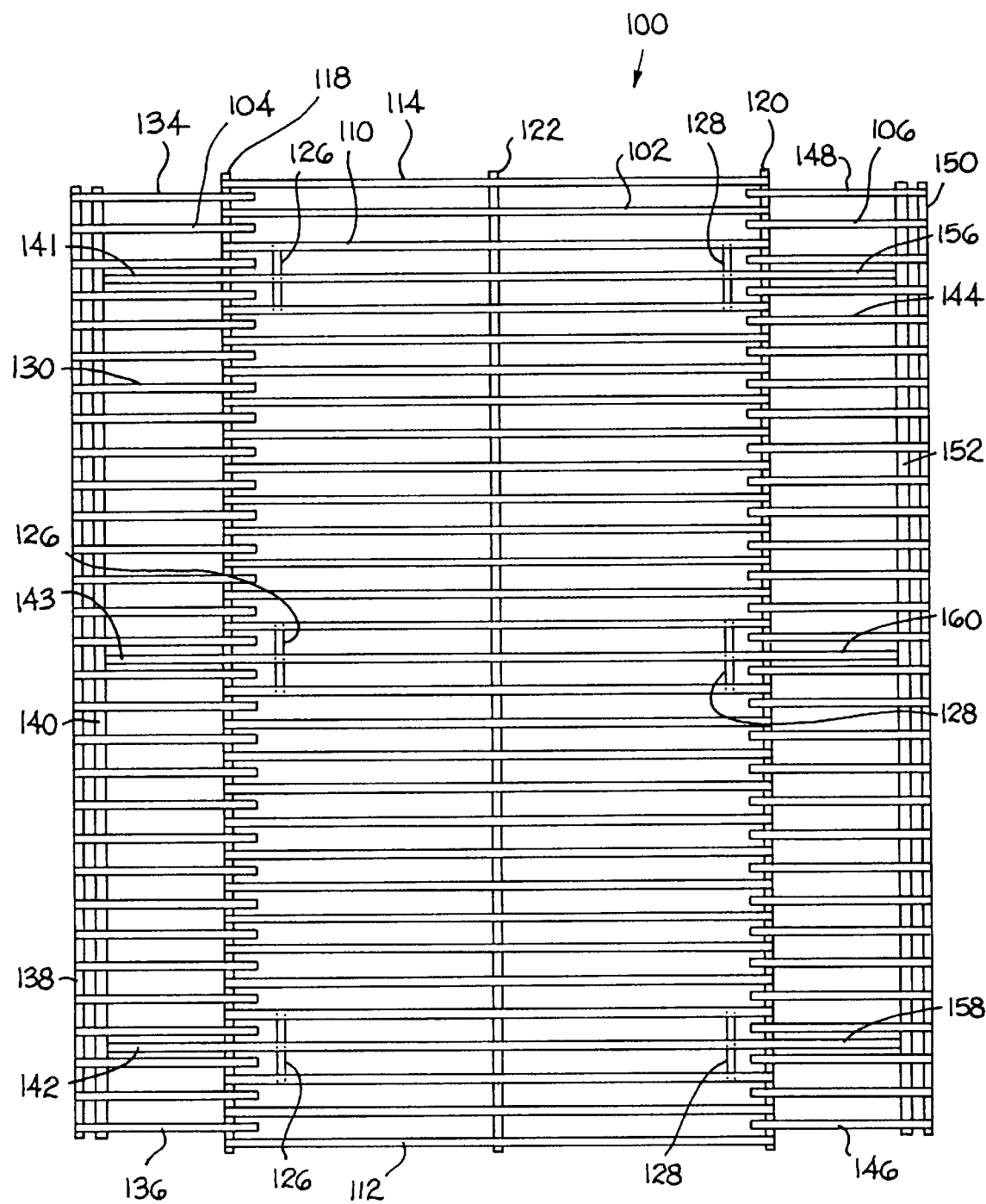
FIG. 9 is a top view of a second specific embodiment of the grid assembly wherein there is a grid body with two outriggers wherein one outrigger extends from the front edge of the grid body and the other outrigger extends from the rear edge of the grid body.
Figure 11:
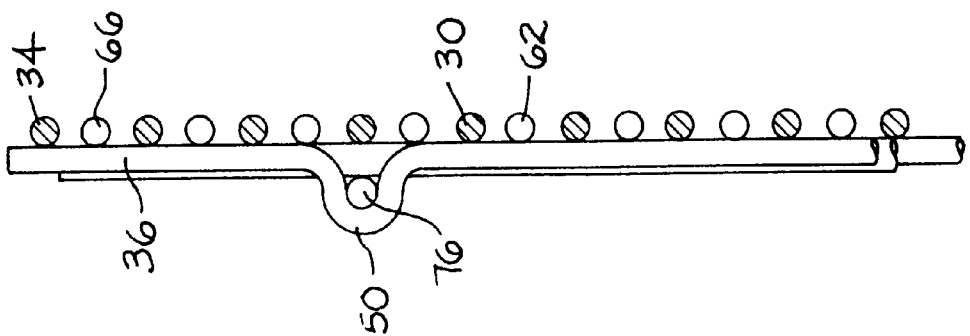
FIG. 11 is an enlarged view of the area indicated by the dashed circle "11" in FIG. 7.
Figure 10:
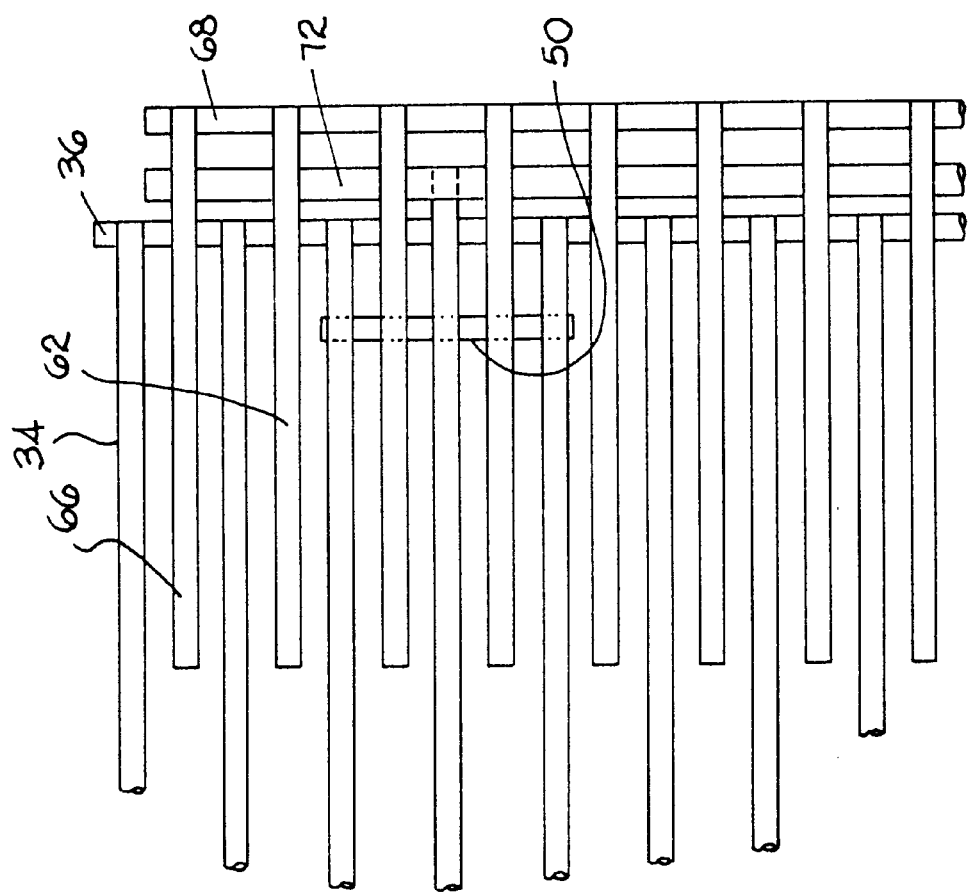
FIG. 10 is an enlarged view of the area indicated by the dashed circle "10" in FIG. 6.
Figure 12:
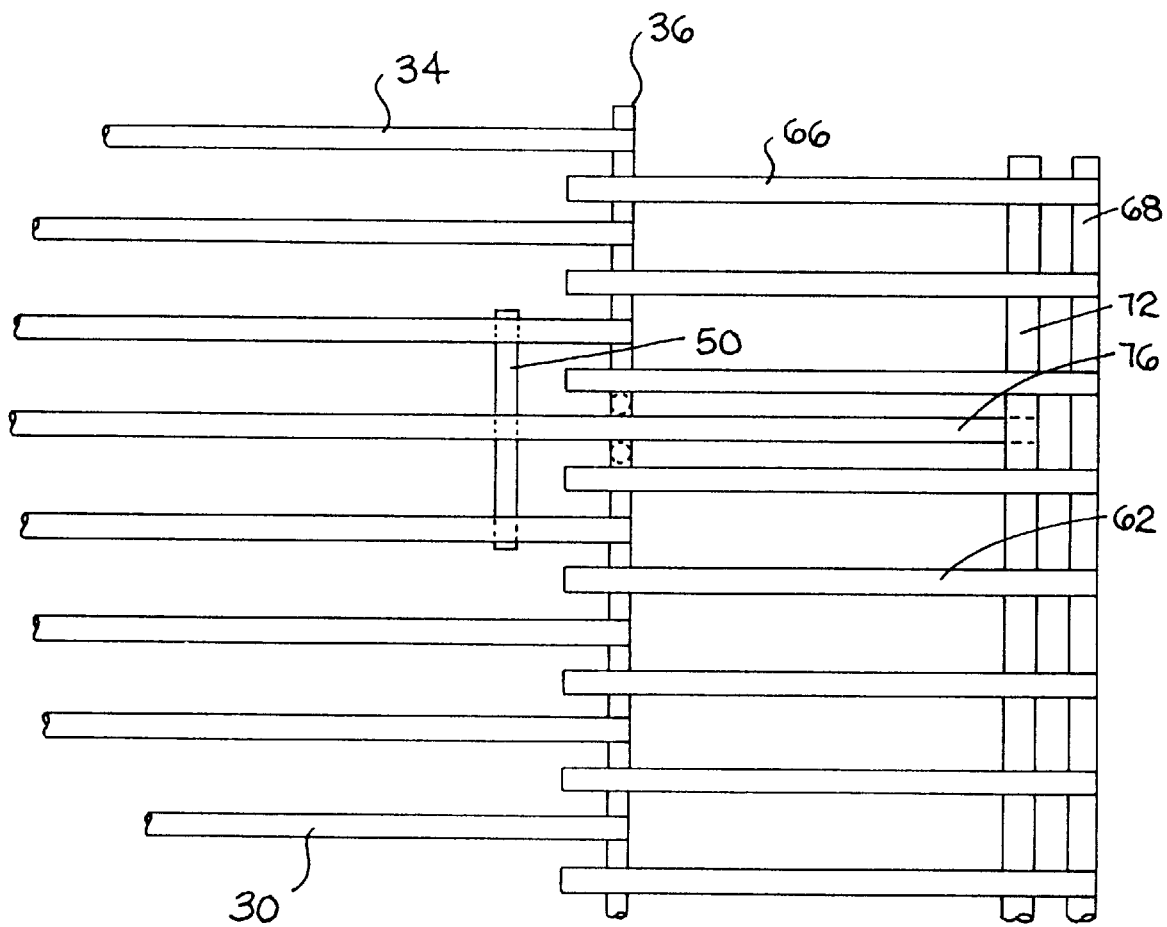
FIG. 12 is an enlarged view of the area indicated by the dashed circle "12" in FIG. 8.

Referring to FIG. 9, there is illustrated another specific embodiment of the invention wherein the grid assembly is generally designated as 100. Grid assembly 100 includes a grid body 102 and a pair of outriggers 104 and 106.

The main grid body 102 presents a plurality of mediate grid cross wires 110. The grid body 102 further includes an edge grid cross wire 112 which defines one edge of the grid body 102 and another edge grid cross wire 114 which defines the other, opposite edge of the grid body 102. The grid cross wires (110, 112, 114) are generally parallel to one another. The grid body 102 further includes a front brace wire 118 and a rear brace wire 120 and a mediate brace wire 122 wherein these brace wires (118, 120, 122) are generally parallel to one another, as well as generally perpendicular to the grid cross wires. These brace wires (118, 120, 122) are attached to the grid cross wires (110, 112, 114). The grid body 102 includes a trio of brackets 126 attached to the cross wires and a trio of brackets 128 attached to the cross wires in a fashion like the brackets are attached to the grid body in the embodiment of FIG. 1 wherein each bracket defines a passage. The brackets are designed for easy adjustment of the outrigger relative to the grid body, whether in the coated or the uncoated condition.

The grid assembly 100 further includes one (or a first) outrigger 104. The outrigger 104 contains a plurality of mediate cross wires 130 along with an edge cross wire 134 which defines one edge of the outrigger 104 and another edge cross wire 136 which defines the other edge of the outrigger 104. All of the outrigger cross wires, i.e., all of the mediate cross wires 130, the one edge cross wire 134 and the other edge cross wire 136, are generally parallel to one another. The outrigger 104 further includes a brace wire 138 which has an orientation that is generally perpendicular to the cross wires (130, 134, 136). The outrigger 104 also has a spacer wire 140 which also has an orientation that is generally perpendicular to the cross wires (130, 134, 136). The outrigger 104 has two edge locator wires (141, 142) and one mediate locator wire 143 that are attached to the spacer wire 140. The locator wires (141, 142, 143) are generally parallel to the outrigger cross wires.

The grid assembly 100 further includes another (or second) outrigger 106. The outrigger 106 contains a plurality of mediate cross wires 144 along with an edge cross wire 146 which defines one edge of the outrigger 106 and another edge cross wire 148 which defines the other edge of the outrigger 106. All of the outrigger cross wires, i.e., all of the mediate cross wires 144, the one edge cross wire 146 and the other edge cross wire 148, are generally parallel to one another. The outrigger 106 further includes a brace wire 150 which has an orientation that is generally perpendicular to the cross wires (144, 146, 148). The outrigger 106 also has a spacer wire 152 which also has an orientation that is generally perpendicular to the cross wires. The outrigger 106 has two edge locator wires (156, 158) and one mediate locator wire 160 that are attached to the spacer wire 152. The locator wires (156, 158, 160) are generally parallel to the outrigger cross wires.

In regard to the assembly of the grid assembly 100, the outriggers 104 and 106 slide into the passages defined by the brackets attached to the cross wires in a fashion like that for the first specific embodiment. Hence, the second embodiment provides for the accommodation of fireboxes of different depths with a constant width.

For both embodiments it should be appreciated that the grid body and the outrigger(s) provide a cooking surface over the entire firebox. The presence of the grid cross wires and the outrigger cross wires also provide adequate support for the food resting upon the cross wires so as to be able to accommodate about fifty to eighty pounds of food resting on the grid assembly. In addition, it should be appreciated that the cooking grid has a smaller spacing to accommodate smaller foods and has additional strength when the cross wires of the outrigger overlap with the cross wires of the grid body.

The design of the grid assembly also provides for the easy and effective application of a protective coating, e.g., porcelain enamel, metals (e.g., metallic nickel-chrome) and the like thereto. When the grid assembly is coated with porcelain enamel, the entire grid assembly is cleanable in a dishwasher. By being cleanable in a dishwasher, the porcelain enamel-coated grind assembly does not require lengthy and tedious hand cleaning. When used to support lava rocks or the like, the grid assembly may be used in the uncoated (or raw) condition.

It is apparent that the present invention provides for an improved adjustable grid assembly wherein there is a cooking surface over the entire depth of the barbecue grid so as to utilize the entire cooking capability of the barbecue grid. It is also apparent that the present invention provides for an improved adjustable grid assembly wherein the grid assembly has the structural integrity so as to be able to support a significant amount of weight (e.g., at least from about fifty pounds to about seventy-five pounds) of food-to-be-cooked.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. An adjustable depth grid assembly for a barbecue grill, the assembly comprising:

a grid body having a grid support means for supporting food resting thereon;

the grid body having opposite sides spaced apart a fixed distance;

an outrigger having an outrigger support means for supporting food resting thereon, and the outrigger further including a locator wire; and the grid body further including a bracket, the bracket being located mediate of the opposite sides, the bracket receives and supports the locator wire whereby the depth of the grid assembly being adjustable upon the sliding of the locator wire.

2. The grid assembly according to claim 1 wherein the grid cross wire means comprises a plurality of generally parallel grid support.

3. The grid assembly according to claim 1 wherein the bracket comprises a U-bracket.

4. The grid assembly according to claim 1 wherein the outrigger support means comprises a plurality of generally parallel outrigger cross wires.

5. The grid assembly according to claim 4 wherein the outrigger cross wires are generally parallel to the grid cross wires.

6. An adjustable depth grid assembly for a barbecue grill, the assembly comprising:

a grid body having a plurality of grid cross wires whereby the grid cross wires provide support for one or more objects resting thereon, and the grid body further including at least a first bracket and an opposite second bracket, and the grid cross wires including one edge grid cross wire and an opposite edge grid cross wire;

one outrigger having a plurality of outrigger cross wires whereby the outrigger cross wires provide support for food resting thereon, and the outrigger having at least one locator wire wherein the locator wire being slidably received in the first bracket so that the depth of the grid assembly being adjustable relative to the one edge grid cross wire; and another outrigger having a plurality of outrigger cross wires whereby the outrigger cross wires provide support for food resting thereon, and the other outrigger having at least one locator wire wherein the locator wire being slidably received in the second bracket so that the depth of the grid assembly being adjustable relative to the other edge grid cross wire.

7. The grind assembly according to claim 6 wherein the objects may include one or more of lava rocks, food, cooking briquettes, and flavor enhancers.

8. An adjustable depth grid assembly for a barbecue grill, the assembly comprising:

a grid body having a plurality of grid cross wires whereby the grid cross wires provide support for one or more objects resting thereon, and the grid body further including at least a first bracket and an opposite second bracket, and the grid cross wires including one edge grid cross wire and an opposite edge grid cross wire;

one outrigger having a plurality of outrigger cross wires whereby the outrigger cross wires provide support for food resting thereon, and the outrigger having at least one locator wire wherein the locator wire being slidably received in the first bracket so that the depth of the grid assembly being adjustable relative to the one edge grid cross wire; and another outrigger having a plurality of outrigger cross wires whereby the outrigger cross wires provide support for food resting thereon, and the other outrigger having at least one locator wire wherein the locator wire being slidably received in the second bracket so that the depth of the grid assembly being adjustable relative to the other edge grid cross wire; and the grid body further includes a first grid brace wire attached to the grid cross wires, and the grid brace wire being generally perpendicular to the grid cross wires, and the first bracket being attached to a selected one of to the grid cross wires.

9. The grid assembly according to claim 8 wherein there being a trio of the brackets attached to selected ones of the grid cross wires.

10. The grid assembly according to claim 9 wherein the one outrigger having a trio of locator wires.

11. An adjustable depth grid assembly for a barbecue grill, the assembly comprising:

a grid body having a plurality of grid cross wires whereby the grid cross wires provide support for one or more objects resting thereon, and the grid body further including at least a first bracket and an opposite second bracket, and the grid cross wires including one edge grid cross wire and an opposite edge grid cross wire;

one outrigger having a plurality of outrigger cross wires whereby the outrigger cross wires provide support for food resting thereon, and the outrigger having at least one locator wire wherein the locator wire being slidably received in the first bracket so that the depth of the grid assembly being adjustable relative to the one edge grid cross wire; and another outrigger having a plurality of outrigger cross wires whereby the outrigger cross wires provide support for food resting thereon, and the other outrigger having at least one locator wire wherein the locator wire being slidably received in the second bracket so that the depth of the grid assembly being adjustable relative to the other edge grid cross wire; and the grid body further includes a second grid brace wire attached to the grid cross wires, and the second grid brace wire being generally perpendicular to the grid cross wires, and the second bracket being attached to selected ones of the grid cross wires.

12. The grid assembly according to claim 11 wherein there being a trio of the brackets attached to selected ones of the grid cross wires.

13. The grid assembly according to claim 12 wherein the other outrigger having a trio of locator wires.

14. An adjustable depth grid assembly for a barbeque grill, the assembly comprising:

a grid body having a plurality of grid cross wires whereby the grid cross wires provide support for food resting thereon, and the grid body further including at least one bracket wherein the bracket defines an open passage;

an outrigger having a plurality of outrigger cross wires whereby the outrigger cross wires provide support for food resting thereon;

the outrigger having at least one locator wire wherein the locator wire being slidably received in the bracket passing through the open passage so that the depth of the grid assembly being adjustable, and the grid body having a first depth and the outrigger having a second depth, and the first depth being different from the second depth.

15. The grid assembly of claim 14 wherein the first depth is greater than the second depth.

16. The grid assembly of claim 14 wherein the outrigger being disposed at an angle with respect to the grid body.

* * * * *